H. S. AUERBACH.
PROCESS FOR TREATING CERTAIN ORES.
APPLICATION FILED SEPT. 6, 1906.
941,904.
Patented Nov. 30, 1909.
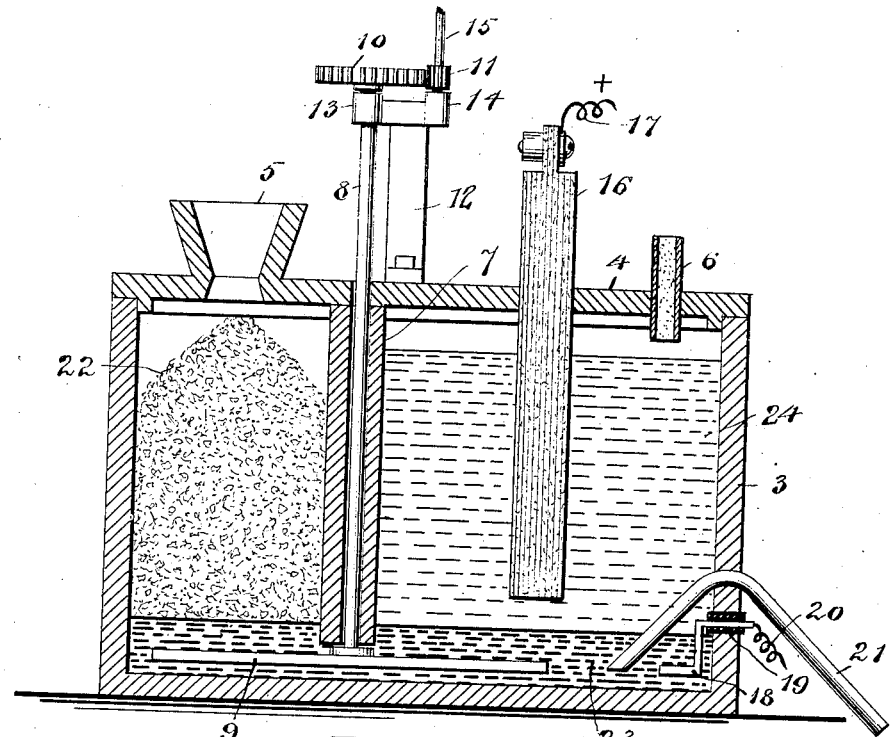
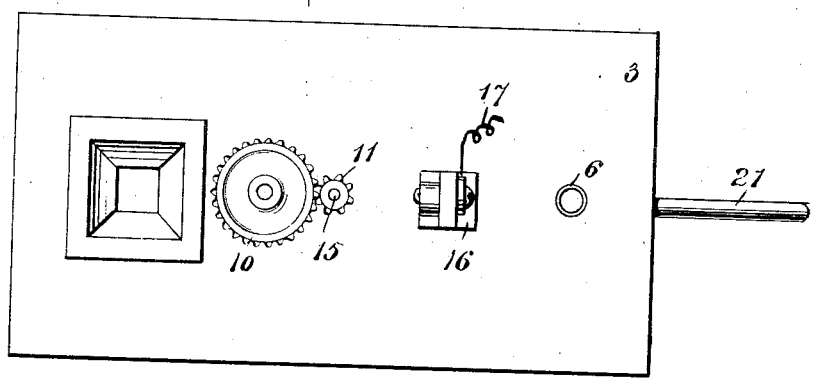
WITNESSES
John a Bugstrom
Walton Harrison
INVENTOR
Herbert S. Auerbach
BY Munn & Co
ATTORNEYS

UNITED STATES PATENT OFFICE.

HERBERT SAMUEL AUERBACH, OF NEW YORK, N. Y.

PROCESS FOR TREATING CERTAIN ORES.

941,904.

Specification of Letters Patent. Patented Nov. 30, 1909.

Application filed September 6, 1906. Serial No. 333,415.

*To all whom it may concern:*

Be it known that I, HERBERT S. AUERBACH, a citizen of the United States, and a resident of the city of New York, borough of Manhattan, in the county and State of New York, have invented a new and Improved Process for Treating Certain Ores, of which the following is a full, clear, and exact description.

My invention relates to the electrolytic separation of metals from their ores, and admits of general use but is of special value in connection with the production of metallic lead from galena and other plumbic ores.

My method has no direct relation to any particular form of apparatus. In the accompanying drawings, however, forming a part of this specification, in which similar characters of reference indicate corresponding parts in all the figures, I show one simple form of apparatus whereby my method can be carried out.

Figure 1 is a central vertical section through an electrolytic apparatus provided with means for receiving the ore and for sending an electric current through the fused baths employed; and Fig. 2 is a plan view of the same apparatus.

A containing vessel 3, made preferably of or lined with fire clay, earthen ware, coke, or other refractory non-conducting material, is provided with a cover 4 having a funnel 5 preferably integral therewith. Extending through the cover 4 is a tube 6 for permitting the escape of sulfur fumes and gaseous compounds. Mounted centrally within the containing vessel 3 is a partition 7 extending downwardly almost to the bottom of the vessel. Journaled within this partition 7 is a vertical shaft 8 provided at its lower end with a revoluble spider 9 and at its upper end with a gear 10, the latter meshing with a pinion 11. A bracket 12 is provided with bearings 13, 14, the bearing 13 encircling the upper end of the shaft 8 and the bearing 14 encircling the lower end of a driving shaft 15 upon which the pinion 10 is mounted. Power being applied to the shaft 15, the spider 9 is rotated. A carbon electrode is shown at 16, and connected with the same is a conducting wire 17. At 18 is another electrode which preferably enters the containing vessel 3 through a sleeve 19 of refractory insulating material. Connected with the electrode 18 is a wire 20. A siphon 21 passes directly through the wall of the containing vessel and reaches to a point just above the bottom of the vessel. The outer or free end of the siphon extends below the bottom of the containing vessel.

The reduction of the lead depends upon the reactions brought about at elevated temperatures by metals in a nascent state when liberated by electrolytic action. In connection with my method it should be borne in mind that lead sulfid is soluble in metallic lead. A considerable variety of electrolytic baths may be used above the body of lead. Among these may be mentioned the following: Cryolite and calcium chlorid ($CaCl_2$); calcium chlorid and sodium potassium chlorid cryolite and calcium fluorid; calcium chlorid and calcium fluorid. Salt ($NaCl$) may be added in various quantities, provided the containing vessel is covered as shown, so as to prevent loss by volatilization. The bath preferably used consists of cryolite. Baths having a fluorin basis are better than those having a chlorin basis.

Suppose, now, that the object is the reduction of galena or other metallic sulfids. The ore 22 is poured into the funnel 5 and finds its way downwardly into one end of the containing vessel 3. A quantity of metallic lead 23 is placed in the bottom of the containing vessel 3 and heat is applied so as to melt this lead. The ore 22 partially dissolves within the bath of molten lead 23 which acts as a sort of collector. An electrolyte 24 is now placed upon the molten lead 23 and also fused by heat applied externally or internally to the containing vessel. This electrolyte may consist of almost any haloid salt of the alkali or alkaline earth metals. Any insoluble impurities contained within the lead bath 23 have a tendency, by virtue of a difference in specific gravity, to form a scum or covering upon the upper surface of the lead bath and may be removed from time to time. If iron be present it will alloy with the lead, and if the iron content be kept below four per cent. the fluidity of the lead is not seriously affected. If there be an accumulation of impurities which are soluble within the electrolyte 23 they may be removed by the addition of chlorids to the bath and at intervals these chlorids may be dissolved out. They may afterward be crystallized out from the solution employed for removing them and when thus recovered they may be used over and over. After a time impurities accumulate in the bath, and if a chlorid salt or a mixture of chlorid salts be used as an electrolyte, these chlorids may be dissolved out at intervals and afterward crystallized and used again. This is not possible if fluorin salts are used. A high current density may be employed. This gives a high internal heat and quick reduction. If a charge of lead is placed within the containing vessel and is rendered molten, it acts as a collector, and as the fused bath 24 rests directly upon it good electrical connection is complete from the carbon electrode 16 to the metallic electrode 18. The current being passed through the molten liquid from the carbon to the electrode 18 the halogen gases are liberated while aluminum sodium, calcium or potassium (depending upon the bath employed), is liberated from the electrolyte 24 and forms an alloy with or is dissolved in the molten lead 23. The liberated metal or metals combine with the lead sulfid in solution or alloyed with the metallic lead, forming a sulfid or sulfids of the attacking metal or metals and reducing lead sulfid. The new sulfid or sulfids formed are decomposed by the electric current, the sulfur going off as a gas or compound while the liberated metal or metals of the alkali or alkaline earths again attack the lead sulfid and the process as described is repeated. Metallic lead is thus continuously produced and sulfur is liberated and distils off at the surface of the electrolyte. It may be collected and burned for purposes of heating the cell or may be piped away and used for chemical purposes. The sodium sulfid or sodium, calcium, potassium or aluminum, as the case may be, and which is formed during the operation, requires a lower electro-motive force for decomposition than is required in the case of the haloid salts. Therefore the power consumption is lowered. The supply of the ore may be continuous or intermittent as desired. The metallic lead is drawn off through a tap from time to time.

While it is possible that some of the sulfids are not soluble in fused lead, I have learned that among sulfids thus soluble are those of lead, silver, zinc, copper, antimony, arsenic and iron. The sulfids of lead, zinc and copper are especially adapted for my process. The silica or alumina and similar impurities are easily removed when the ore is subjected to the action of a fused lead bath. The impurities not soluble simply float upon the surface of the bath, and may be removed by aid of a rake or spoon or in any other suitable manner.

It will be understood that my method is applicable to the reduction of all classes of ores, concentrates, mattes, or other sources of metal, and that the reduction of lead sulfid is taken merely as an illustration. For the reduction of galena and other sulfid ores, especially those sulfids of lead carrying zinc, silver or gold, any or all, the method possesses peculiar advantages.

Having thus described my invention, I claim as new and desire to secure by Letters Patent:—

1. The method herein described of reducing an ore soluble in fused lead, which consists in forming a body of fused lead, resting a fused electrolyte upon said body of fused lead, adding directly to said body of fused lead an ore soluble therein, meanwhile preventing the direct contact of said ore with said fused electrolyte, and finally passing an electric current through both said fused electrolyte and said body of fused lead, said body of fused lead serving as a cathode.

2. The method herein described of reducing ores soluble in fused lead, which consists in forming a body of metal, supplying thereto the ore to be treated, forming an electrolyte above said body of metal and out of contact with said ore, connecting such ore as the cathode and reducing the ore by the passage of an electric current through said body of metal and through said electrolyte.

3. The method herein described of reducing certain ores herein named, which consists in forming a body of molten lead, resting upon said body of molten lead a fused haloid salt, adding to said body of fused lead an ore soluble therein, meanwhile preventing direct contact between said ore and said fused haloid salt, and finally sending an electric current through said fused haloid salt and said body of fused lead.

4. The method herein described of reducing galena, which consists in forming a body of fused lead covered by a fused electrolyte, bringing said galena directly into contact with said fused lead while preventing direct contact between said galena and said fused electrolyte, and finally passing an electric current through said electrolyte and through said body of fused lead, said body of fused lead serving as a cathode.

5. The method herein described of reducing galena, which consists in forming a body of fused lead, covering a part of said body of fused lead with a bath of fused haloid salt, leaving another part of said body of fused lead protected from said haloid salt, and bringing said part of said body of fused lead unprotected into engagement with said galena, and finally passing an electric current through said bath of fused haloid salt and said body of fused lead.

In testimony whereof I have signed my name to this specification in the presence of two subscribing witnesses.

HERBERT SAMUEL AUERBACH.

Witnesses:
DONALD A. FINLAYSON
JOHN THYNE.